United States Patent [19]

Rathman

[11] Patent Number: 4,467,558
[45] Date of Patent: Aug. 28, 1984

[54] ALL TERRAIN HERBICIDE APPLICATOR SYSTEM

[76] Inventor: Robert Rathman, Rte. 1, Box 147, Cairo, Nebr. 68824

[21] Appl. No.: 492,168

[22] Filed: May 6, 1983

[51] Int. Cl.³ .............................................. A01G 13/00
[52] U.S. Cl. ...................................................... 47/1.5
[58] Field of Search ...................... 47/1.5, 1.7; 111/69; 173/43; 172/833, 303, 482

[56] References Cited

U.S. PATENT DOCUMENTS

| | | |
|---|---|---|
| 926,791 | 7/1909 | Watson . |
| 947,297 | 1/1910 | Davidson . |
| 2,361,100 | 10/1944 | Hipple ..................................... 111/69 |
| 3,257,753 | 6/1966 | Zennie . |
| 3,320,694 | 5/1967 | Biron . |
| 4,019,278 | 4/1977 | McKirdy ................................. 47/1.5 |
| 4,187,638 | 2/1980 | Hardy et al. . |
| 4,208,835 | 6/1980 | Roll et al. . |
| 4,328,640 | 5/1982 | Revelle . |

Primary Examiner—Robert E. Bagwill
Assistant Examiner—Bradley M. Lewis
Attorney, Agent, or Firm—Orrin M. Haugen; Thomas J. Nikolai; Douglas L. Tschida

[57] ABSTRACT

A herbicide application system employing a wick applicator in adjustable suspension with a three wheeled all terrain vehicle. The suspension system comprises a rectangular frame that is rotatably affixed to the ATV and to the wick applicator, such that the operator may independently adjust the angle of the wicks and the elevation of the liquid reservoir via an associated lever/linkage assembly and a tilt arm/spring loaded detent assembly.

3 Claims, 6 Drawing Figures

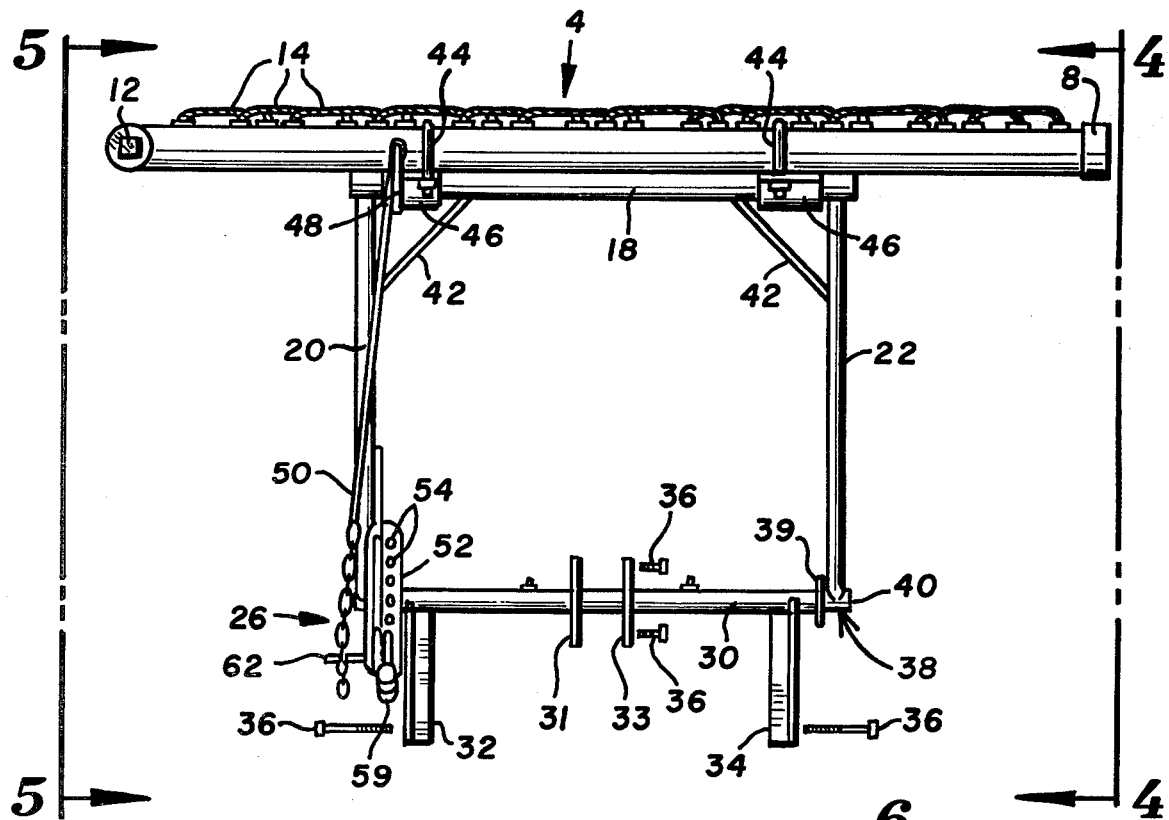
FIG. 3
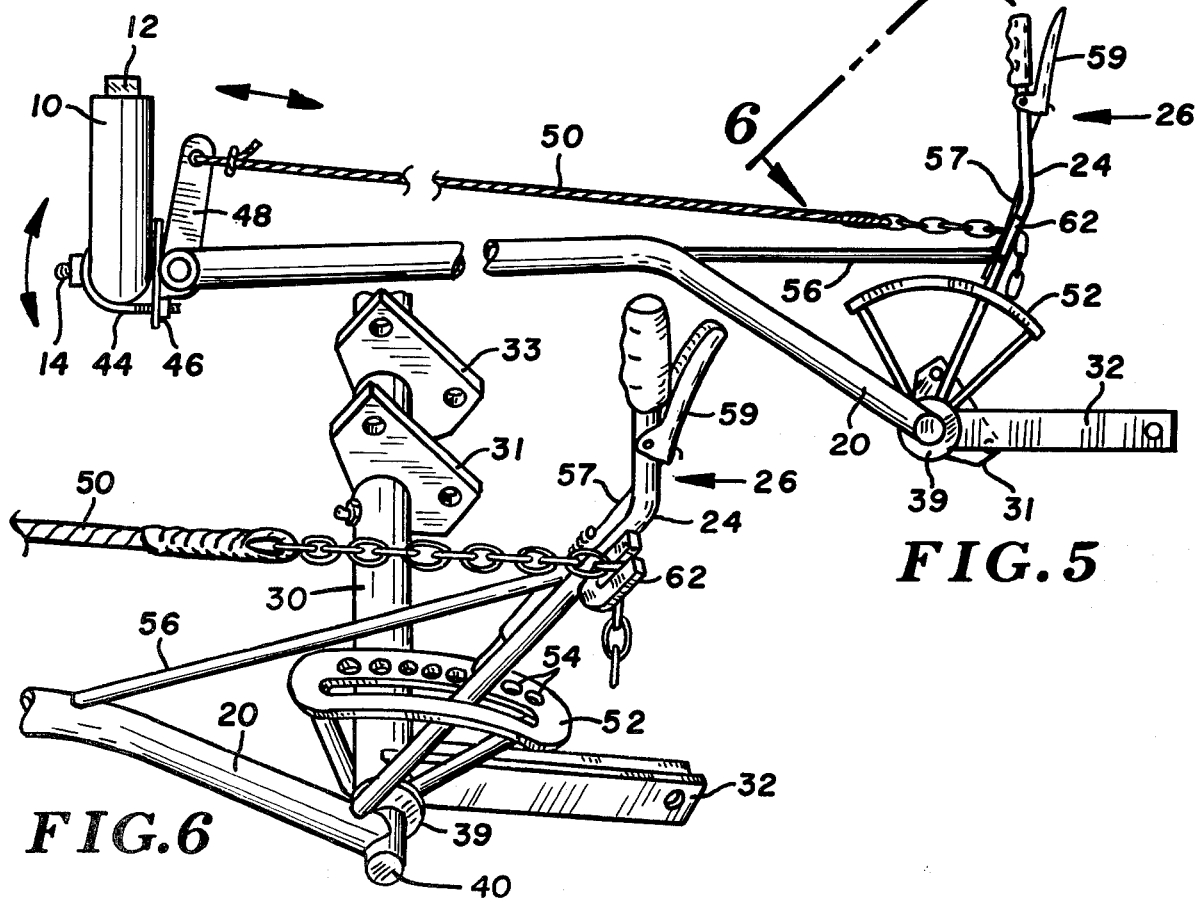
FIG. 5
FIG. 6

ALL TERRAIN HERBICIDE APPLICATOR SYSTEM

BACKGROUND OF THE INVENTION

The present invention relates to herbicide application systems and in particular to a wick type system adaptable to an all terrain vehicle (ATV).

During the growing cycle of row crops, it is desirable at various times to apply various plant treatment chemicals, such as herbicides, to kill fast growing weeds and other undesired plants that tend to shade, crowd or otherwise compete with the growth of the desired row crops. To ignore such plants results in less than optimum crop yields, but associated with any application system are considerations relative to the additional costs of the herbicide, application time and expenses associated therewith.

Various different application systems have been employed in the past for applying liquid chemicals via spray or contact methods, some examples of which can be seen upon reference to U.S. Pat. Nos. 926,791; 3,257,753; 3,320,694; 4,019,278; and 4,208,835. More particularly and with respect to the present system, a wick application system has also been proposed in U.S. Pat. No. 4,187,638. A wick application system is generally comprised of a tube-like reservoir that contains the liquid treatment chemicals as they are dispersed. A single wick or a number of wick segments are, in turn, spaced along the tube and mounted to the tube such that the wicks absorb the liquid chemicals and whereby the chemicals are applied to the undesired weed plants by contact therewith as the wicks pass thereover.

Typically, such a wick applicator as well as the various other application assemblies are conveyed relative to the row crops via ordinary farm tractors and hydraulically controlled support assemblies. Such a manner of conveyance is, however, rather costly in terms of time and gas consumption, in that the tractors have rather large engines and are not very maneuverable relative to the row crops, due to the wheel size and width and spacing between the row crops. Furthermore, such methods of application may create soil compaction problems, and the large vehicles are oftentimes hampered by wet soil conditions, such as are encountered during the spring, when it is most important to apply the herbicide.

The present invention, therefore, contemplates an improved application system that is adaptable to heretofore recreational all terrain vehicles, such as are manufactured by the various motorcycle and sport vehicle manufacturers. These vehicles are typically of the three wheel type, having engines of approximately 110 cc's, wheel displacements of approximately 43" and ground clearances of approximately 5½". In particular, the present system is compatible with a Honda ATC 185, but it is to be recognized that various other 3 or 4 wheel ATV's may similarly be employed with or without some slight modification of the present apparatus. Such vehicles are highly maneuverable and since they weigh approximately only 200 to 400 pounds they present no soil compaction problems nor are they hindered by most wet soil conditions. Thus, the present system at a relatively nominal cost provides the farm operator greater equipment flexibility and more workable hours of field time.

The above objects, advantages and distinctions of the present invention as well as various others will, however, become more apparent upon a reading of the following description with respect to the following drawings. It is to be recognized though that the following description is illustrative only of the presently preferred embodiment and that still other embodiments and modifications thereto are contemplated.

SUMMARY OF THE INVENTION

A liquid chemical application system comprising a chemical containing reservoir and contact applicator vertically and angularly supported in an adjustable manner relative to a highly maneuverable all terrain vehicle. The applicator of the preferred embodiment comprises a tube-like liquid chemical filled reservoir having a plurality of liquid absorbing wick segments spaced therealong for distribution of the liquid chemicals via contact with the weed plants.

The support assembly, in turn, comprises a rectangular frame that is mountable to opposite sides of the vehicle and which is rotatable about a thus constrained fixed axis. The reservoir is rotatably mounted to the opposite end of the frame via an operator adjustable linkage and lever assembly and the frame is vertically adjustable via an offset tilt arm coupled to one side of the frame. In particular, the length of the linkage is adjustable for controlling the angle of the wick applicator relative to the row crops; while the tilt arm rotates the frame relative to a spring loaded detent assembly and which, in turn, secures the frame and applicator at an operator selected elevation relative to the row crops.

BRIEF DESCRIPTION OF THE DRAWINGS

FIG. 3 shows a top view of a present support assembly and wick applicator assembly.

FIG. 5 shows a left elevation view of the present support and wick applicator assemblies.

FIG. 6 shows a perspective view of the tilt lever mechanism and associated angle and elevation maintaining mechanisms.

DESCRIPTION OF THE PREFERRED EMBODIMENT

Figure 1:
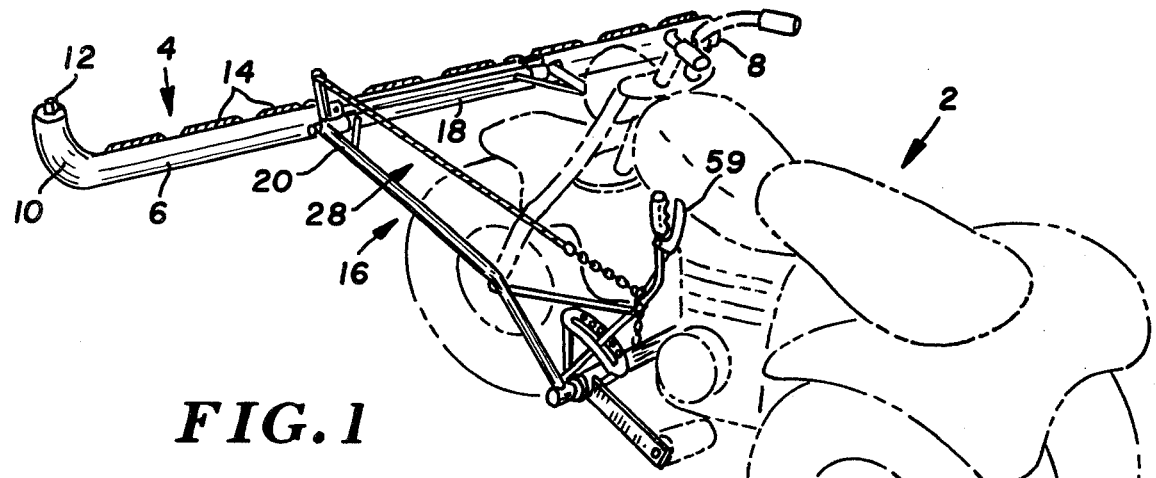
FIG. 1 shows a left side perspective view of the present system relative to an ATV.
Figure 2:
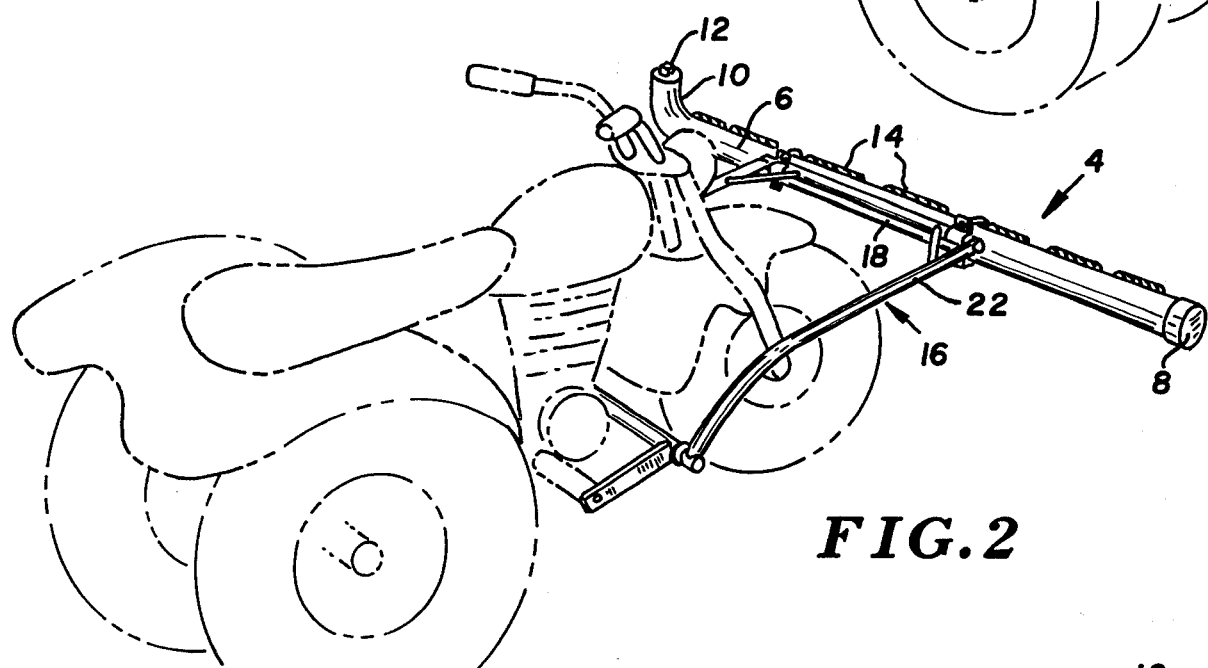
FIG. 2 shows a right side perspective view of the present invention relative to an ATV.

Referring to FIGS. 1 and 2, perspective views are shown of the left and right sides of the present invention relative to a typical ATV 2, such as a Honda ATC 185 and which is shown in phantom. Such all terrain vehicles are typically of the three wheel type and support the vehicle above various ground terrain via three balloon-like off-road tires. As mentioned, such vehicles are typically 43" inches wide and thus by stradlling a row between one front and one rear tire the vehicle is able to accommodate row crop spacings on the order of 27 inches or more. However, it is to be noted that should the wheels of the ATV 2 contact some of the row crops, damage to the row crops is negligible due to the vehicle 2's light weight and weight dispersal. In fact, most plant seedlings are resilient enough to withstand any contact.

Mounted to the front of the ATV 2 is a wick applicator assembly 4 which is comprised of a tube-like reservoir 6 having a straight capped end 8 and a 90° curved end 10 with a removable cap 12. In the present embodiment, the reservoir 6 is constructed from a polyvinylchloride (PVC) tubing having an inside diameter of either three or four inches. The ends 8, 10 and 12, similarly, are constructed from readily available PVC fittings. It is thus to be recognized that the reservoir 6, while shown as a tube, may alternatively be constructed in any other desirable shape with or without wicks, and, for example, having associated parallel tubing, for containing additional volumes of herbicide. The primary concern of any such alternative configuration though is that an even weight distribution be maintained relative to the ATV 2. For the present preferred embodiment, a 8¼ foot length of 2 inch diameter tubing is preferred and which, when filled, holds approximately 1¾ gallons of herbicide.

Associated with the reservoir 6, are a number of wick segments 14 that are cut to desired lengths and spaced relative to one another so as to partially overlap in their areas of contact. Each wick segment 14 is, in turn, coupled to the reservoir 6 via well known compression couplers that are threadably connected to holes bored in the reservoir 6. For the present embodiment, the wick and couplers are obtained in kit form from the Monsanto Corporation.

Supporting the wick applicator 4 relative to the ATV 2 is a tubular support assembly 16 that essentially comprises a rectangular frame, one narrow side 18 of which is coupled to the wick applicator 4 and the opposite narrow side of which is fixedly coupled to the ATV 2. The manner of attachment will, however, be described in greater detail hereinafter. The adjacent and slightly bent sidearms 20 and 22 are, in turn, rotatably attached to the fixed side of the frame assembly 16.

The elevating control for the frame assembly 16 is achieved via a tilt arm 24 and associated spring loaded detent assembly 26. Also associated with the tilt arm 24 is an adjustable linkage assembly 28, coupled to the wick applicator, for permitting the operator to rotatably control the angle of the wick segments 14 relative to the ground. Thus, the operator may not only control the elevation of the wick applicator 4, but also the angle of the wicks 14. The details of the present support assembly will however become more apparent upon reference to the remaining drawings and their associated description.

In this regards, attention is next directed to FIG. 3 wherein a top view is shown of the present support assembly 16 relative to the wick applicator 4. From this view, the manner of construction of the support assembly 16 is more readily apparent. In particular, the details of the narrow side of the frame which attaches the support assembly 16 to the ATV 2 is more readily apparent and which comprises a continuous tubular member 30 that has weldably coupled thereto a number of mounting brackets 31, 32, 33 and 34. The center brackets 31 and 33 are welded to the side member 30 in such a fashion that upon mounting, the brackets 31 and 33 contact the frame of the ATV 2, while the welded brackets 32 and 34 contact the ends of the foot rests. Associated bolts and nuts 36, in turn, mount through the brackets and complete the attachment of the support assembly 16 to the ATV 2.

From FIG. 3, it should also be noted that the forward projecting side frame members 20 and 22 rotate about the ends of the thus fixed side member 30 via hinged joints 38 (only one of which is shown for side frame member 22). The hinged joint 38 is comprised of a short section of tubing 40 of a diameter similar to the tubular frame that is welded orthogonally to the end of side member 22 and which, in turn, is welded to a section of rod (not shown) that is contained inside of the frame member 30. It is to be noted that the contained rod has a diameter comparable to the inside diameter of the tubular frame so that it rotates freely therein; and also that the rod is continuous within the frame member 30 so as to cause the hinged joints 38 for each of the frame members 20 and 22 to act in concert when raised or lowered and to add additional strength to the support assembly. A washer 39 completes each hinged joint and separates the sections of tubing 40 from the continuous frame member 30. It should also be noted that associated with the side members 20 and 22 are a pair of side cross-braces 42 that couple the sides 20 and 22 of the frame to the end 18, thereby adding further strength, and that zerk fittings are provided on the member 30 to permit the greasing of the rod 40.

The end frame member 18 is, in turn, attached to the wick applicator 4 via two U bolt assemblies 44. Each of the U bolt assemblies 44 are coupled to short segments of piping 46 of an inside diameter closely approximating the outside diameter of member 18 and each of which contain a mating bracket to an associated U bolt for securing the reservoir 6 thereto. The sections of pipe 46 are thus rotatably mounted about the end member 18 with each of the segments 46 act like spaced apart hinges that rotate about the end member 18 upon exerting an appropriate force on the lever 48. Depending upon the amount of rotation of the lever 48 and the initial setting of the U bolt assemblies 44, the angle of the wick segments 14 are easily varied relative to the ground. The rotating force is, in turn, imparted via a rope/chain linkage assembly 50 that is coupled to the upper-most end of the lever 48 and to the tilt arm 24. The details thereof will however be described hereinafter.

Before continuing, it is also to be noted that the tilt arm 24 and its path of travel is constrained via a slotted and arcuate incremental control assembly 52. A number of different elevations are, in turn, provided via associated and spaced apart holes 54 that are bored therein and which interact with the spring loaded detent assembly 26.

Figure 4:
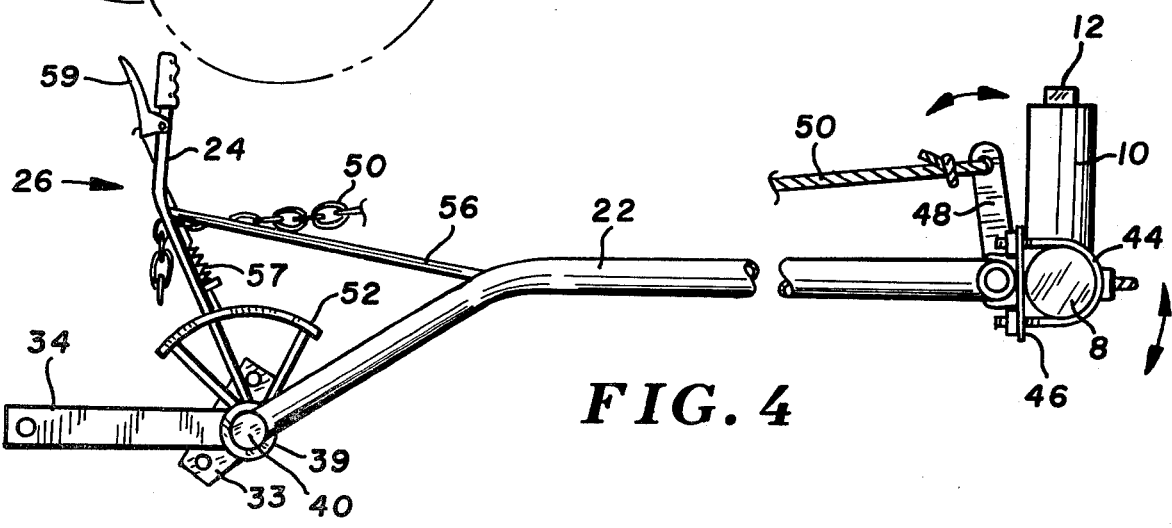
FIG. 4 shows a right elevation view of the present wick applicator and support assemblies.

Referring next to FIGS. 4 and 5, respective right and left side views of the support assembly 16 can be seen and from which the various details of the control mechanisms should be more apparent. Specifically, the mechanisms for independently controlling the rotation of the wick applicator 4 and the elevation of the support frame should be more clear. The former control is provided via the rope/chain 50, lever 48 and U-bolts 44 and their associated rotatable tubular segments 46; whereas the latter is controlled via the independent rotation about the hinges 38 of the sides 20 and 22 as controlled via the tilt arm 24 and associated connecting arm 56 that is coupled to the bend in the side member 20.

Finally, upon referring to FIG. 6, a more detailed perspective view of the operator accessible tilt and rotation control elements is shown. From this view, it can be seen that as the tilt arm 24 moves forward and backward along its constrained path, it can be positionally constrained via a spring loaded link pin 57 of the detent assembly 26, upon inserting the pin 57 into any one of the various holes 94. It should be noted too that the link pin 57 is spring loaded via a tubular member and spring that are mounted to the tilt arm 24, link pin 57, and lever handle 59 such that upon the operator's squeezing the lever handle 59 the link pin 57 is pulled up and the spring is contracted and whereby the link pin 57 will slip into any of the various holes 54, upon the operator releasing the lever 59 while the pin 57 is in alignment with any of the various holes 54. Thus, the elevation of the wick applicator 4 is controlled via the operator's squeezing the lever handle 59 and moving the tilt arm 24 to a desired elevation and releasing the lever 59 and link pin 57 so as to constrain the tilt arm 24 and support assembly 16 at that desired elevation.

The angle of the wick segments 14, on the other hand, is controlled via the rope/chain linkage 50 and which may be lengthened or shortened so as to cause the lever 48 to rotate, along with the chemical soaked wick segments 14, and whereby the angle of the wick segments 14 is varied. A specific angle is maintained via an associated chain capture mechanism link slot member 62 that is attached to the tilt arm 24 such that various ones of the chain links may be placed therein so as to vary the length of the linkage 50. It is to be recognized though that while a rope/chain linkage 50 has been described, various other solid or spring loaded linkages may also be employed.

From the above, it should be apparent that the present support assembly 16 permits the mounting of a wick applicator 4 to an ATV 2 so as to achieve an improved system for applying herbicides or other plant treatment chemicals to row crops, especially under wet or otherwise heretofore inaccessible field conditions. While the present invention has been described with respect to its preferred embodiment, it is to be recognized that various modifications may be made thereto without departing from the spirit of the present disclosure. It is therefore contemplated that the present invention should include all such equivalent structures as are within the scope of the present disclosure and the following claims.

What is claimed is:

1. Apparatus for applying treatment chemicals to plants comprising in combination:
    a relatively light weight and highly maneuverable balloon tired all terrain vehicle (ATV);
    an elongated tubular reservoir having a plurality of wick segments mounted therealong and extending forwardly thereof and containing plant treatment chemicals for dispensing said chemicals via contact between said wick segments with said plants; and
    support means coupling said chemical dispensing means to said ATV for independently and selectively varying the elevation of said reservoir and/or rotating said reservoir to vary the angle of said wick segments with respect to said plants, said support means including:
    a four sided frame, one side of which is coupled to said reservoir, second and third sides of which are bent downward and the forward most ends of which are fixedly coupled to the ends of said one side and the opposite ends of which are rotatably coupled to a fourth side and which fourth side is fixedly attached to said ATV;
    a tilt lever coupled to at least one of said second or third sides and including an operator accessible detent assembly, said lever being operable while said ATV is in motion to selectively vary and maintain a selected elevation of said one side and reservoir relative to the ground with changing ground conditions; and
    means rotatively coupling said one side to said reservoir and including a flexible length adjustable linkage comprised of joined lengths of rope and chain and an associated chain link capture mechanism mounted to said tilt lever for selectively and rotatively varying the angle at which said treatment chemicals are dispensed relative to the ground via the lengthening or shortening of said linkage relative to said capture mechanism and thereby permitting an operator to vary the angle of dispersion while in motion, depending on ground conditions.

2. Apparatus as set forth in claim 1 including spring loaded detent means associated with said tilt means for maintaining an operator selected elevation.

3. Apparatus as set forth in claim 1 wherein said reservoir rotating means includes a lever, one or more rotatable clamps coupling said reservoir to said forward most end, a flexible, length adjustable linkage coupled to said lever and means for selectively constraining said flexible linkage at a desired length and whereby the angle of rotation is maintained.

* * * * *